United States Patent [19]

Bernard

[11] Patent Number: 4,871,026
[45] Date of Patent: Oct. 3, 1989

[54] TRENCH FORMING DEVICE AND GUIDANCE METHOD

[75] Inventor: Emeric E. Bernard, Tintah, Minn.

[73] Assignee: Bernard-Hensch, Inc., Austin, Tex.

[21] Appl. No.: 168,380

[22] Filed: Mar. 15, 1988

[51] Int. Cl.⁴ ............................................. A01B 69/00
[52] U.S. Cl. .................................. 172/26; 104/244.1; 172/191; 172/297
[58] Field of Search ................. 172/26, 190, 191, 297, 172/518, 126, 676, 134, 304, 300, 833; 180/131; 104/244.1, 242, 245

[56] References Cited

U.S. PATENT DOCUMENTS

| | | | |
|---|---|---|---|
| 1,019,199 | 3/1912 | Sutton | 172/26 |
| 2,164,543 | 7/1939 | Peacock | 172/833 |
| 2,335,175 | 11/1943 | Davenport | 172/297 X |
| 2,358,298 | 9/1944 | Benjamin | 172/304 |
| 2,743,655 | 5/1956 | Rafferty | 172/304 |
| 3,004,611 | 10/1961 | Tanke | 172/297 X |
| 3,765,501 | 10/1973 | Burvee | 104/244.1 |
| 3,840,076 | 10/1974 | Capehart | 172/190 |
| 3,998,275 | 12/1976 | Eisenhardt | 172/26 |
| 4,117,889 | 10/1978 | Larson | 172/26 |
| 4,298,084 | 11/1981 | Newell | 172/26 |
| 4,484,647 | 11/1984 | McGrew | 172/26 |
| 4,493,375 | 1/1985 | Winter | 172/26 |
| 4,655,295 | 4/1987 | Barnes | 172/26 |

*Primary Examiner*—Richard J. Johnson
*Attorney, Agent, or Firm*—Merchant, Gould, Smith, Edell, Welter & Schmidt

[57] ABSTRACT

A method of guiding farm equipment is provided. The method includes the steps of attaching a trench forming device to a tractor in front of the rear wheels of the tractor, traversing ground with the tractor equipped with the trench forming device set to a desired depth, forming a trench for guiding farm equipment in front of the rear wheels of the tractor as the tractor traverses the ground, engaging guide wheels attached to the farm equipment in the trench, and guiding the farm equipment by tracking a path provided by the trench. A trench forming device is also provided. The trench forming device includes a trench forming mechanism for forming a trench in ground traversed by a tractor equipped with the trench forming device. The trench forming device is attached to the undercarriage of the tractor and located behind the front wheels and in front of the rear wheels of the tractor such that a trench can be formed in front of the rear wheels when the tractor traverses the ground and the trench forming device is set to a desired depth and engaged in the ground.

30 Claims, 8 Drawing Sheets

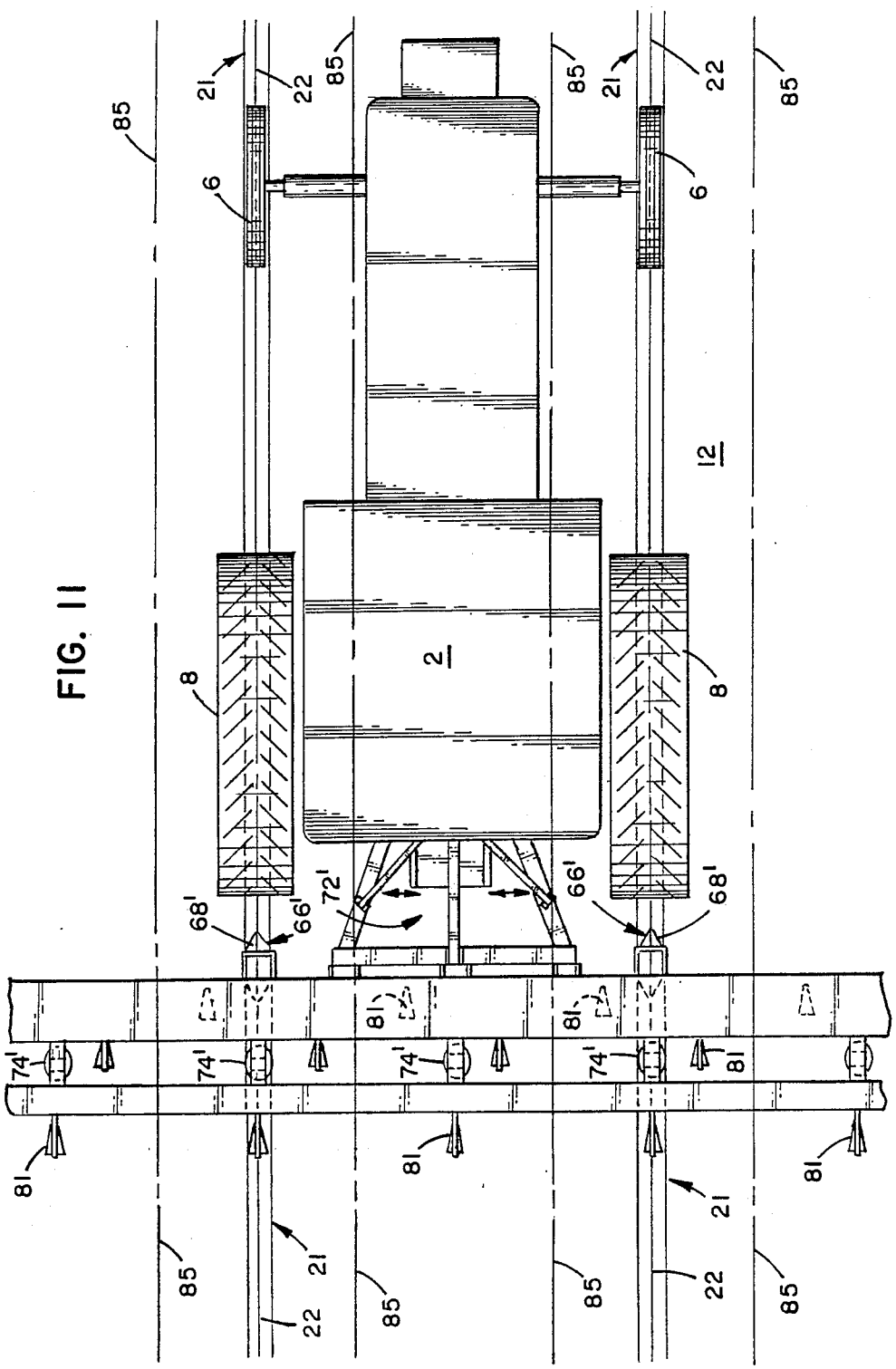

TRENCH FORMING DEVICE AND GUIDANCE METHOD

FIELD OF THE INVENTION

The present invention relates to a trench forming device for attachment to a tractor and methods for guiding farm equipment during farming operations.

BACKGROUND OF THE INVENTION

For years farmers have attempted to create trenches in the ground to guide farm equipment when they are planting row crops such as corn, sunflowers, soybeans, cabbage, cauliflower, celery, sugar beets, and the like. These trenches are subsequently used to guide the front wheels of the tractor when the farmer is engaged in cultivating operations or chemical application operations subsequent to planting. The trenches are used to guide the front wheels of the tractor so that the standard spacing of the row crops can be anticipated in carrying out subsequent cultivation and chemical application operations.

Unfortunately, previous methods for forming these trenches have been inadequate to maximize farming efficiency.

Initially, farmers used a chisel type device to rip two parallel trenches in the soil during planting operations. The implement used to rip the trenches in the soil was attached to the planter or an implement attached to the implement attachment bar behind the tractor. Unfortunately, the resulting trenches were disruptive to the soil surface and were believed to result in increased soil moisture loss through evaporation. In addition, the ripped trenches were often filled in or eroded by heavy winds or rain. Furthermore, these trenches did not provide very substantial tracks for the tractor wheels to follow.

Subsequently, implements were developed to provide a wheel which followed each of the chisel-type devices. The wheel was used to roll over the disrupted ground in order to leave a somewhat more consistent trench. However, moisture loss from the disrupted soil surface in the trenches was still believed to be a problem and trenches created by such implements continue to erode when exposed to heavy rainfall and/or heavy winds.

Furthermore, both methods are subject to inefficiencies due to operator errors which create deviations from a straight-line path in the planted rows and the trenches. Operator errors often occur when the operator allows the tractor to "drift" toward or away from the previously planted row adjacent to the farmer's present planting position. Operators generally use a locked hitch when planting because they are especially concerned about accuracy. Because the object is to plant substantially parallel rows, the operator will generally turn the front wheels of the tractor sharply when the farmer realizes that the row being planted is slightly off the desired line parallel to the adjacent, previously planted row. The sharp turn of the front wheels can have the desired effect of returning the tractor to the desired line. However, when a locked hitch is used, the planter and the chisel devices, planting seed and ripping the trenches behind the tractor, will move sharply in an opposite direction. This is because the tractor and the attachments pivot on the rear wheels when the front wheels turn sharply. This sharp movement of implements behind the tractor creates sharp deviations from the desired straight-line path in both the planted rows and the trenches.

The resulting deviations in the path of the planted rows and the trenches result in inefficiencies during subsequent cultivation and chemical application operations. When subsequent attempts are made to follow or track the trenches with the front wheels of a tractor pulling a cultivation device or a chemical application device, the deviations will cause the front wheels of the tractor to turn the front end of the tractor, thereby pivoting tightly hitched implements towed behind the tractor. Consequently, subsequent cultivation or chemical application carried out behind the tractor, well removed from the front wheels which track the trenches, will deviate from a straight-line path at a location in the planted rows which precedes the actual deviation in the planted rows corresponding with the deviation in the trenches. This can result in the destruction of the row crops by the cultivator blades, commonly known as "Cultivator Blight", or in the waste of chemicals applied to the unplanted space between the planted rows and a failure to treat areas of planted rows. Because sharp deviations are necessarily common, given the high degree of skill required to plant row crops in perfectly straight rows and to create perfectly straight trenches, farmers are required to spray pesticides and other chemicals in wider bands than might otherwise be required. Wide chemical application bands are required because the inconsistencies in the paths of the trenches cannot be easily tracked. In order to be sure each plant is treated, the width of the band where chemicals are applied must be widened in order to minimize the failures to treat areas of planted rows due to sharp deviations in the trenches and/or the path of the planted rows.

The present invention addresses these and other problems associated with the formation and use of trenches formed during planting operations to guide farm machinery engaged in cultivation and/or chemical application operations subsequent to the planting of row crops. The present invention also offers other advantages over the prior art, and solves other problems associated therewith.

SUMMARY OF THE INVENTION

In accordance with the present invention, a method of guiding farm equipment is provided. The method comprises the steps of attaching means for forming a trench to a tractor, the tractor having an undercarriage and a plurality of ground-engaging wheels including front wheels and rear wheels, the trench forming means being attached to the undercarriage of the tractor behind the front wheels and in front of the rear wheels; traversing ground with the tractor equipped with the trench forming means set to a desired depth; forming a trench for guiding farm equipment in front of the rear wheels of the tractor as the tractor traverses the ground when the trench forming means engage the ground, the farm equipment including means for guiding the farm equipment along a path; engaging the guide means in the trench; and guiding the farm equipment by tracking a path provided by the trench.

In accordance with the present invention, preferred embodiments provide methods for planting row crops, cultivating row crops, and applying chemicals to row crops. Another embodiment provides a method of forming a trench for guiding farm equipment. In preferred embodiments, a trench for guiding farm equipment is formed in front of the rear wheels of the tractor having a greatest width of greater than about 3 inches (about 7.5 cm), and a depth of at least about 6 inches (about 15 cm). Preferably, the trench forming means include disk means for forming a trench, preferably including two trench shaping disks and a disk support structure. The support structure is pivotally attached to the undercarriage behind the front wheels and in front of the rear wheels. The disks are rotatably attached to the support structure such that the disks form two substantially parallel trenches when the ground is traversed by the tractor and the trench forming means are set to a desired depth.

To plant row crops, a planter is preferably attached to the tractor with a loose hitch. The loose hitch allows the planter to take a path which can vary from a path taken by the tractor preferably by up to about 2-10 inches (about 5-25 cm). The planter preferably includes guide means for guiding the planter along a path. The guide means are engaged in the trench and track the trench so that the planter follows a path substantially the same as a path provided by the trench when the planter is pulled by the tractor traversing the ground, thereby planting row crops with said planter.

In other preferred embodiments, the planter may be unhitched and other implements, preferably a cultivator or a chemical applicator, may be hitched to the tractor with a loose hitch in preparation for a subsequent farming operation. Whether the subsequent operation involves cultivation or chemical application, the implement used includes implement guide means which are engaged in the previously formed trench and track the trench so that the implement follows the path provided by the trench when the tractor pulling the implement traverses the previously planted ground. The front wheel of the tractor also tracks the trench so that the tractor follows the path provided by the trench. In this way, many farming operations may be conducted subsequent to planting row crops utilizing the trenches formed during planting to provide a path which may be tracked during the subsequent operations. Because the trench or trenches formed during planting are preferably deep and well formed trenches having compacted soil to provide a more durable trench, the present invention provides many advantages over the prior art methods.

In an alternate embodiment of the present invention, a trench forming device for attachment to a tractor is provided. The tractor includes an undercarriage and ground engaging wheels including front wheels and rear wheels. The trench forming device comprises trench forming means for forming a trench in ground traversed by the tractor, the trench forming means being attached to the undercarriage of the tractor and being located behind the front wheels and in front of the rear wheels of the tractor such that a trench can be formed in front of the rear wheels when the tractor traverses the ground and the trench forming means are engaged in the ground. Preferably, the trench forming means include disk means which preferably include a disk support structure and two trench shaping disks rotatably attached to the support structure, the support structure being pivotally attached to the tractor such that the disks can form two substantially parallel trenches when the tractor traverses the ground. Preferably, the disks are spaced so that they are in alignment with the front wheels and the rear wheels of the tractor.

The present invention has many advantages. One of the advantages is the location of the transforming means in front of the rear wheels of the tractor, preferably behind the rear wheels of the tractor. When trenches are formed in this location they may be more readily compacted because they can utilize the weight of the tractor above the trench forming device to force the disks into the ground, thereby compacting the soil as the trenches are formed. In addition, because the disks are located between the front wheels and the rear wheels, rather than behind the tractor in a locked position, operator errors resulting in sharp deviations by the front wheels from a straight-line path, do not result in as great a deviation as one would expect in the path provided by the trench formed by the disks. The disks are preferably located closer to the rear wheels than they are to the front wheels of the tractor. Because the tractor pivots on the rear wheels when it makes sharp movements, the front wheels can be expected to pivot through a greater distance when pivoting on the rear wheels, than any structures located closer to the rear wheels. Therefore, if the front wheels deviate about a foot from the line they are taking, it would be expected that the disks being located between the front and rear wheels, preferably closer to the rear wheels, would deviate from the path they are taking only about 30-60%, preferably about 40-50%, of the distance of the deviation of the front wheels. This can be very advantageous. Because the degree of the deviations are minimized, the trenches are easier to follow. Because the crops are planted in rows which substantially track the trench formed by the disks, the deviations in the crop rows due to operator error are also minimized. Furthermore, because the planter is loosely hitched to the tractor when the crop rows are planted, the planter is free to plant seed in rows which substantially correspond to the path provided by the trench. It will be appreciated that this is a great advantage over the prior art. Because the crop rows can be planted in rows which substantially correspond to the trenches, subsequent farming operations such as cultivation, chemical application, and the like, may be carried out in a much more efficient manner.

When cultivating, the cultivator is preferably loosely hitched to a tractor so that the guide wheels of the cultivator can independently track the path provided by the trench. In this manner, the deviations in the crop rows do not present a significant problem so long as they are not so great that the guide wheels of the cultivator are unable to remain in the trench.

Because deviations in the crop rows can be anticipated by engaging the guide wheels of a chemical applicator in the trenches formed during planting, chemicals can be more accurately applied to the planted crop rows. This is very important because it allows chemical application operations to be completed in a more cost effective manner. It will be appreciated that there will be fewer instances where chemicals are applied to unplanted ground or where there is a failure to treat areas of planted crop rows. Furthermore, because greater chemical application accuracy is allowed by the present invention, the width of the chemical application bands can be reduced from the normal bands of about 7-11 inches (about 18-28 cm) to provide for a narrower application band of about 3-6 inches (about 7.5-15 cm), preferably about 4-5 inches (about 10-13 cm). This increased chemical application efficiency will allow farmers to reduce the amount of chemical applied to fields by about 30%, preferably about 40% and most preferably about 50%, thereby allowing significant cost savings because of the great expense of chemicals used in current farming operations.

In preferred embodiments, the present invention can be employed by the farmer to form better trenches which allow the soil in the trench to become compacted so that it will stand up to rain and wind erosion better than the trenches formed by the prior art methods. Because the present invention allows the soil in the trench to be compacted there will also be a reduction in the amount of soil moisture which is allowed to evaporate from the soil. It will be further appreciated that compaction of the soil in the trenches allows the trenches to have a more rigid, sturdy form which allows for greater reliance upon the trench to guide farm equipment.

In preferred embodiments of the present invention, the trenches have a depth of at least about 6 inches (about 15 cm), preferably about 7.5 inches (about 19 cm), most preferably about 9 inches (about 23 cm), and a greatest width of preferably about 3 inches (about 7.5 cm), more preferably about 4 inches (about 10 cm), and most preferably about 5 inches (about 13 cm). These large trenches allow farmers to cultivate at higher speeds than have been used in the past. Also, the compact nature of the trenches provide a rigid path for the front wheels of the tractor and/or the guide wheels of the implement to follow. These firm, well formed, trenches allow farmers to cultivate their row crops at speeds up to about 7 mph, preferably about 10 mph, more preferably about 15 mph, whereas previous cultivating speeds have generally been about 2.5–5 mph.

It will be appreciated that the ability to cultivate row crops at speeds up to 15 mph will reduce the time which the farmer and the tractor will be required to be in the field. This will result in a reduction in the time required to cultivate fields and will save gasoline because tractors generally burn fuel by the hour of operation, not by the number of acres traversed during farming operations.

Therefore, the present invention provides for faster cultivation due to more substantial trenches which are easier to follow, reduced "Cultivator Blight" and increased chemical application efficiency due to better coordination of planting with the path provided by the trenches, and reduced moisture evaporation due to greater compaction of the soil in the trenches.

The above described features and advantages, along with various other advantages and features of novelty are pointed out with particularity in the claims of the present application. However, for a better understanding of the invention, its advantages and objects attained by its use, reference should be made to the drawings which form a further part of the present application and to the accompanying descriptive matter, in which there is illustrated and described preferred embodiments of the present invention.

BRIEF DESCRIPTION OF THE DRAWINGS

In the drawings, in which like reference numerals and letters indicate corresponding parts of the preferred embodiment of the present invention throughout the several views.

FIG. 11 is a plan view of two substantially parallel trenches formed in accordance with the present invention being tracked by the front wheels of a tractor shown in phantom pulling a farm implement having guide wheels tracking the paths provided by the trenches.

DETAILED DESCRIPTION OF THE PREFERRED EMBODIMENTS

Figure 1:
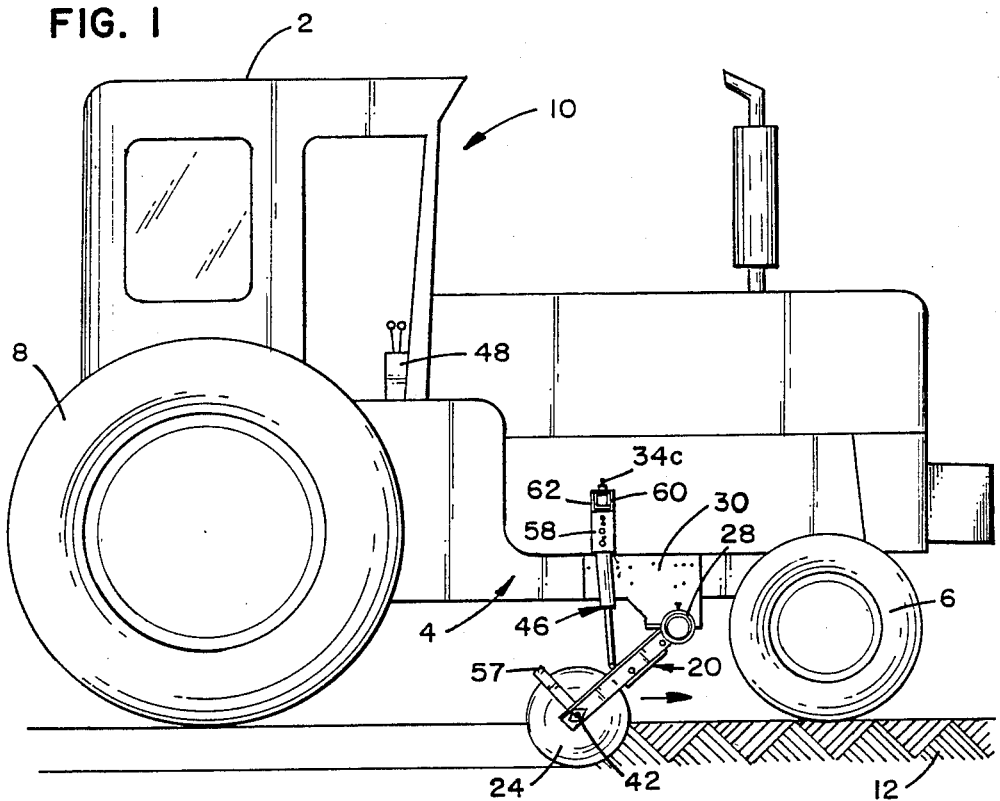
FIG. 1 is a side view of a trench forming device attached to a tractor in accordance with the present invention.
Figure 2:
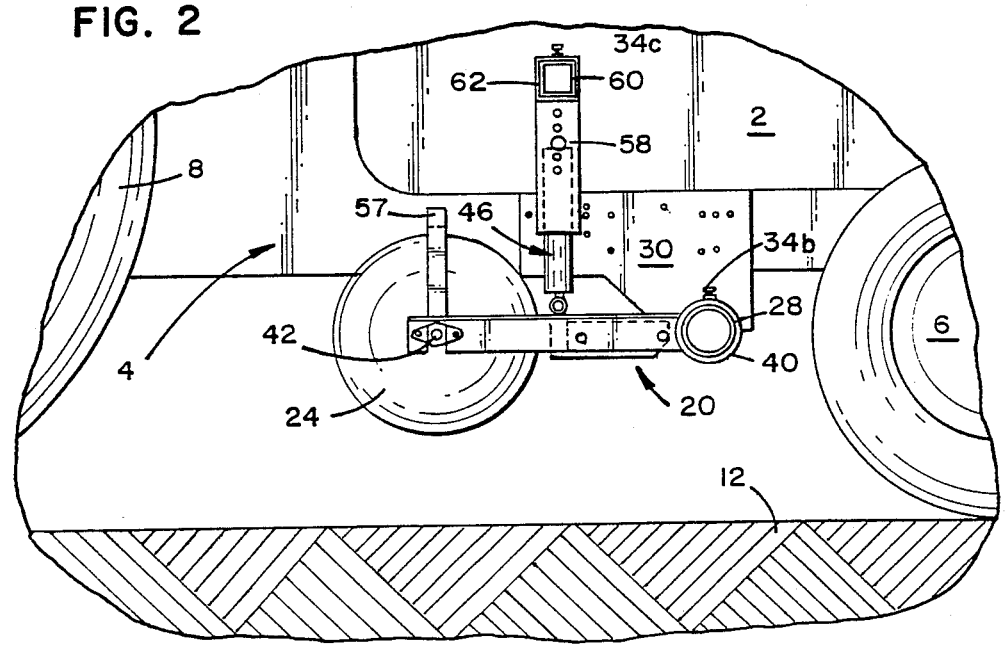
FIG. 2 is an enlarged side view of a portion of the tractor shown in FIG. 1 including the trench forming device attached to the tractor which is in an up position.

Referring now to the drawings, and FIGS. 1 and 2 in particular, the present invention provides a trench forming device 20 as shown in FIGS. 1 and 2. The trench forming device 20 is attached to an undercarriage 4 of a tractor 2. The tractor 2 has a plurality of ground engaging wheels including front wheels 6 and rear wheels 8.

Figure 3:
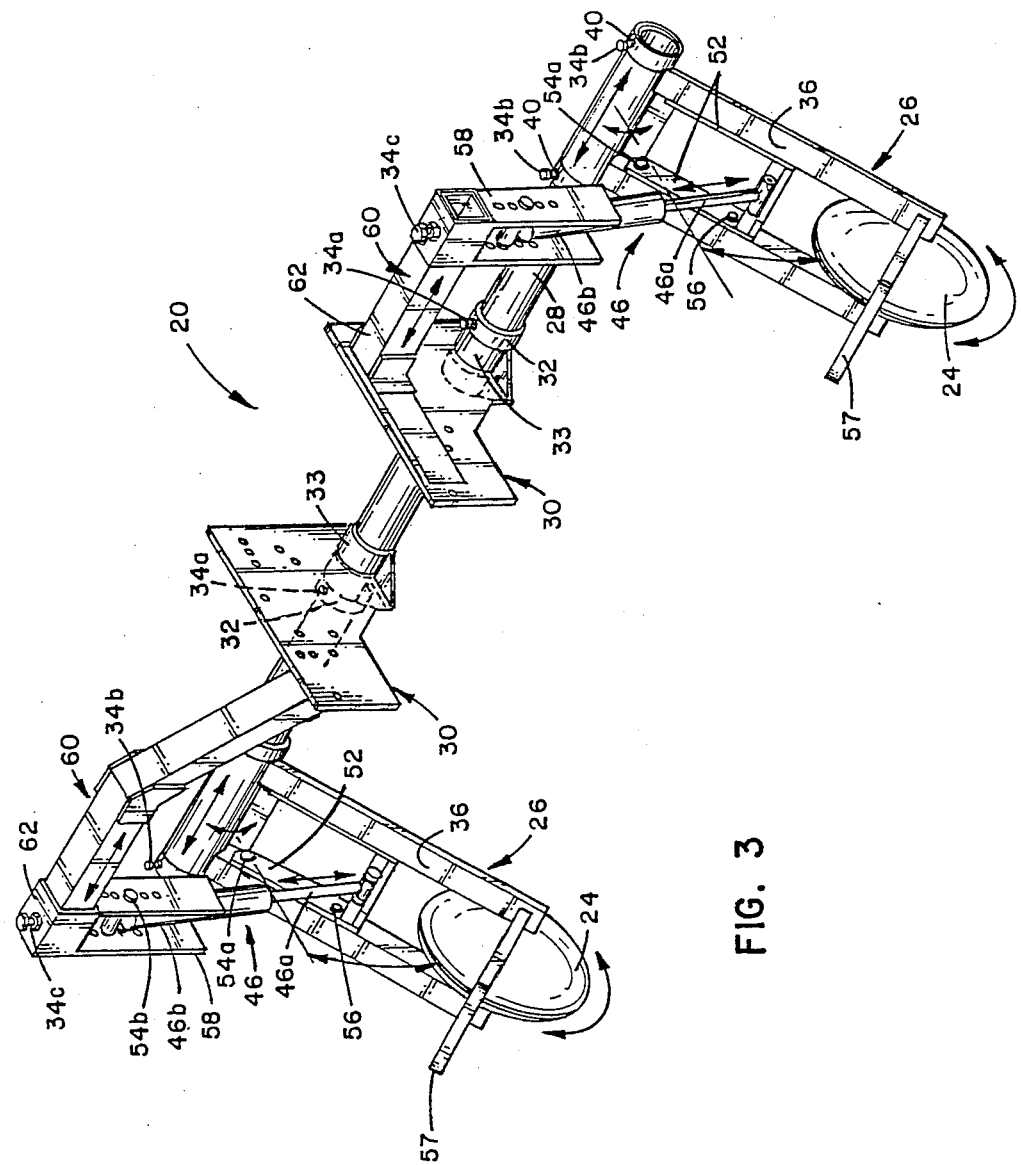
FIG. 3 is a perspective view of the trench forming device shown in FIG. 1.
Figure 4:
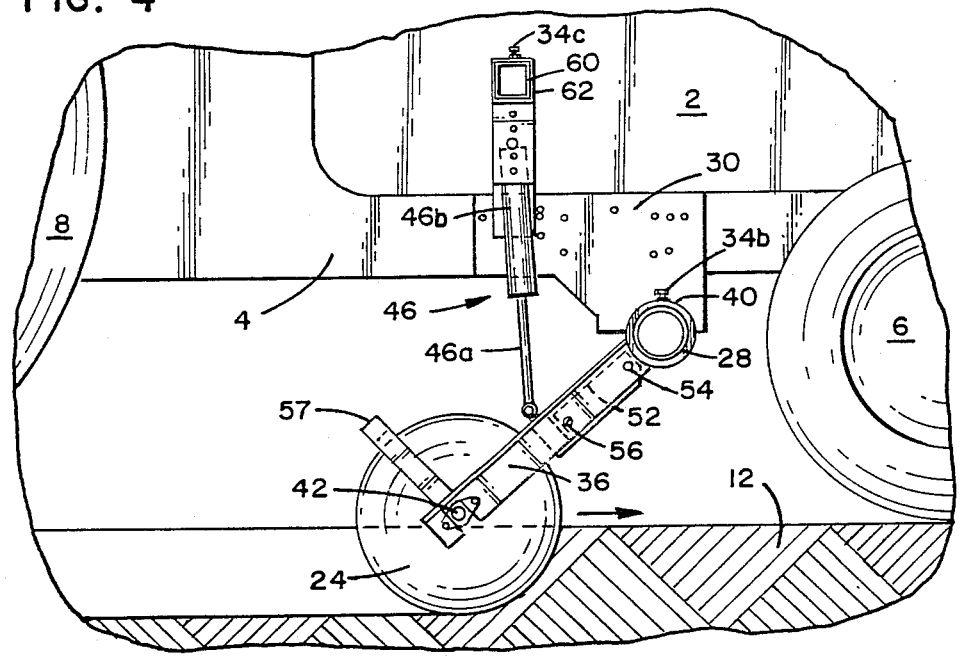
FIG. 4 is a side view of the trench forming device of the present invention in a down position.
Figure 5:
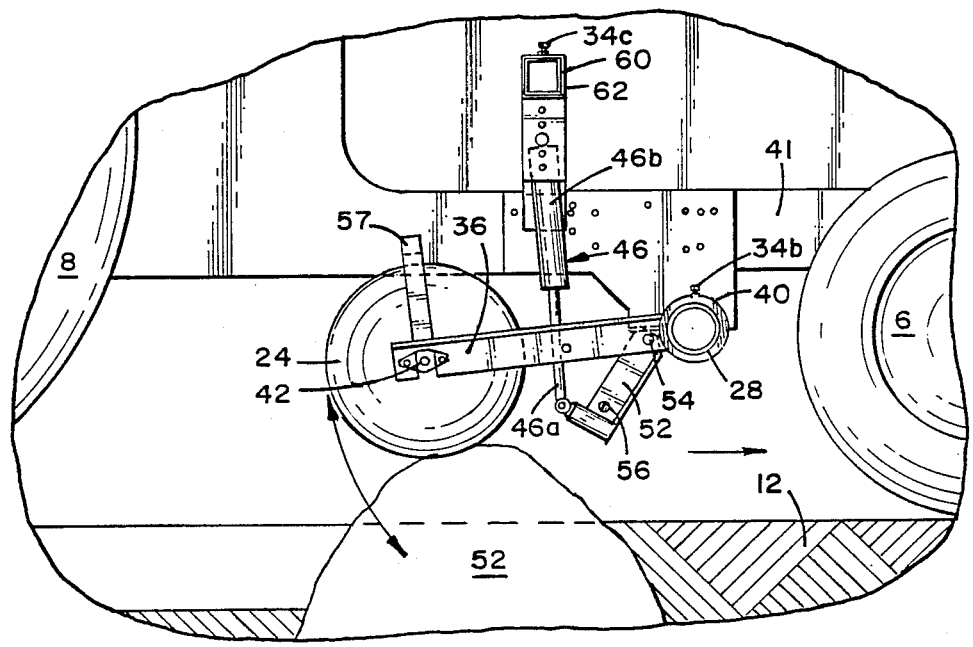
FIG. 5 is a side view of the trench forming device of the present invention set in the down position after striking an immovable obstruction and breaking the shear pin of the obstruction fault release mechanism.
Figure 6:
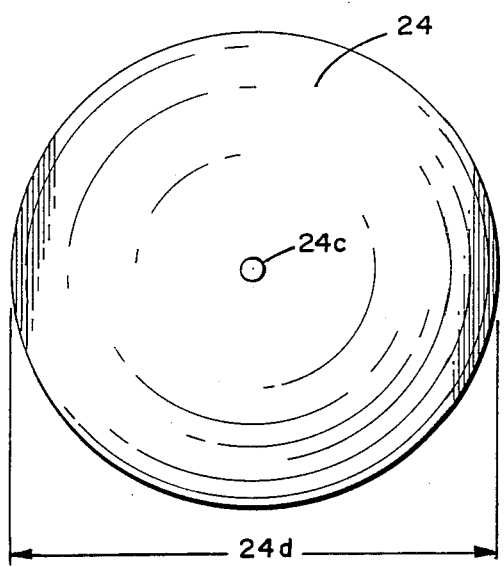
FIG. 6 is a plan view of a trench shaping disk of the present invention.

Referring now also to FIGS. 3, 4 and 5, the trench forming device 20 includes two trench shaping disks 24, a disk support structure 26, and tractor mount side panels 30. The tractor mount side panels 30 are attached to the undercarriage 4 from the sides of the tractor 2. The side panels 30 are contiguous with mounting bar collars 33. The receiving collars 33 receive the mounting bar 28 which is held in place by two side panel clamping collars 32 provided with adjustable screw clamps 34a. When the screw clamps 34a are tightened down, the side panel clamping collars 32 hold the mounting bar 28 in place. The disk support structure includes a disk supporting portion 36 joined to a rotating collar 38 which receives the mounting bar 28. The disk supporting portion 36 can rotate with respect to the mounting bar 28 pivoting about the mounting bar 28. Two mounting bar clamping collars 40 are positioned on the mounting bar 28 adjacent to the rotating collar 38 to prevent the rotating collar 38 from sliding along the mounting bar 28 when the screw clamps 34b of the mounting bar clamping collars 40 are tightened down to engage the mounting bar 28. The position of the disk support structure 26 on either side of the tractor 2 can be adjusted along the mounting bar 28 by loosening the screw clamps 34b of the mounting bar clamping collars 40 and sliding the rotating collar 38 and the mounting bar clamping collars 40 along the mounting bar 28 to the desired position on the mounting bar 28. The screw clamps 34b on the mounting bar clamping collars 40 can then be tightened down to engage the mounting bar 28 to hold the disk support structure 26 in position along the mounting bar 28. The disks 24 are rotatably attached to the disk supporting portion 36 of the disk support structure 26 on disk axles 42 which are attached at the bottom of the disk supporting portion 36. The relative spacing between the two disks 24 can be varied by sliding the rotating collar 38 along the mounting bar 28 to assume new positions thereon, just as the wheels 6 and 8 of the tractor 2 may be adjusted to assume new positions thereby allowing the spacing between each pair of wheels (i.e. the front wheels 6 or the back wheels 8) to be varied.

The trench forming device 20 also includes two hydraulic cylinders 46 which can be controlled by a cylinder control mechanism 48 in the cab 10 of the tractor 2. Each cylinder 46 has a shaft 46a and a sleeve 46b. The disk support structure 26 includes an obstruction fault release mechanism 50 for releasing the disk supporting portion 36 when one of the disks 24 or the supporting portion 36 collide with an immovable obstruction such as the rock 52 shown in FIG. 5. The obstruction fault release mechanism 50 includes the disk supporting portion 36 and a stable mounting portion 52 which are pivotally linked by an axle bolt 54a near the rotating collar 38 and by a shear pin 56 nearer the disk 24. The shear pin 56 holds the stable mounting portion 52 in line with the disk supporting portion 36 until the disk 24 or the disk supporting portion 36 strike an immovable object such as the rock 52 shown in FIG. 5. When the disk 24 collides with an immovable object such as the rock 52, the shear pin 56 will break allowing the disk supporting portion 36 to pivot with respect to the which is pivotally attached to the shaft 46a of the cylinder 46 is allowed to pivot on the axle bolt 54a which connects the stable mounting portion 52 to the disk supporting portion 36. Each disk 24 is also equipped with a disk protector 57.

Each cylinder sleeve 46b is pivotally attached to a cylinder receiving member 58 which is slidably attached to a cylinder mounting member 60. The cylinder mounting member 60 is joined, preferably welded, to the tractor mount side panels 30 on each side of the tractor 2. The cylinder mounting members 60 rise outward and upward from the side panels 30 and then level off to provide a level cylinder adjustment portion 62. The cylinder receiving member 58 is slidably attached to the cylinder mounting member 60. When a screw clamp 34c on a mounting member receiving portion 64 of the cylinder receiving member 58 is loosened, the cylinder receiving member 58 can be moved so that the mounting member receiving portion 64 slides along the cylinder adjustment portion 62, thereby allowing the spacing between the preferably parallel cylinders 46 to be adjusted as the spacing between the disks 24 is adjusted. The sleeves 46b are pivotally attached to the cylinder receiving members 58 by an axle bolt 54b.

When the tractor 2 is standing on the ground 12 as shown in FIG. 1 and 2, the disks 24 can be raised by raising the disk support structure 26, thereby disengaging the disks 24 from the ground 12. When the disk support structure 26 is lowered, the disks 24 will engage the ground 12. The trench forming device 20 of the preferred embodiment includes a mechanism for hydraulically raising and lowering disks 24 and the disk support structure 26. Two hydraulic cylinders 46 are pivotally attached to the disk support structure 26. The cylinders 46 are also pivotally attached to the cylinder receiving members 58. When cylinders 46 are shortened, the disk support structure 26 is raised. When cylinders 46 are lengthened, disk support structure 26 is lowered.

In the preferred embodiment of the present invention, 3" hydraulic cylinders 46 have been employed. Each provides a force of 28,000 psi. This force is capable of lifting the front wheels 6 or rear wheels 8 of tractor 2 off the ground when the disks 24 are unable to penetrate the ground 12. Therefore, it will be appreciated that the cylinders 46 can provide sufficient force when lowering the disk support structure 26 so as to force disks 24 into the ground 12 such that the ground 12 is compacted against disks 24. The ground 12 is also compacted when the disks 24 traverse the ground 12 as shown in FIGS. 1 and 4.

As shown in FIGS. 4 and 5, the disks 24 are preferably round and have two convex surfaces as shown in cross-section. In preferred embodiments, the disks 24 have a diameter 24d of about 10–35 inches (about 25–90 cm) and a greatest width 24w through the center 24c of the disk 24 of about 2–8 inches (about 5–20 cm). Preferably, the diameter 24d of the disks 24 is about 15–30 inches (about 38–76 cm), more preferably about 18–25 inches (about 45–64 cm), and most preferably about 21 inches (about 53 cm). The greatest width 24w of the disks 24 is preferably about 3–7 inches (about 7.5–18 cm), more preferably about 4–6 inches (about 10–15 cm), and most preferably about 5 inches (about 12.7 cm).

Figure 7:
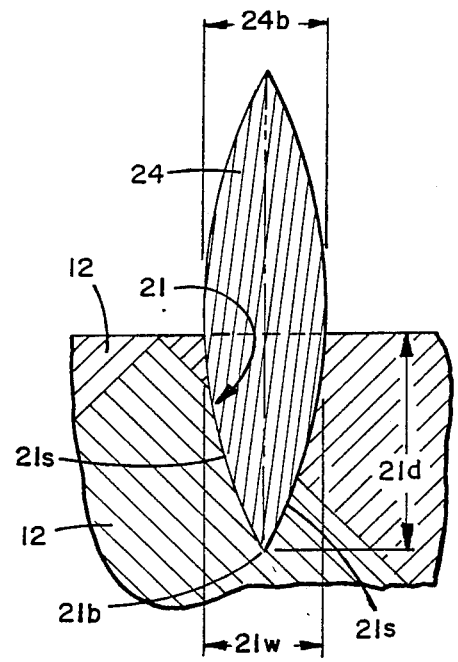
FIG. 7 is a cross-sectional view of the disk shown in FIG. 4 in the ground forming a trench.

Preferably, the trench 21 formed by disks 24 of the present invention have a shape similar to that shown in FIG. 7. The trench 21 will have a decreasing width as it reaches the bottom 21b of the trench 21. The depth 21d of the trench 21 is preferably about 2–15 inches (about 5–38 cm), more preferably about 6–12 inches (about 15–30 cm), and most preferably about 9 inches (about 23 cm). The greatest width 21w of the trench 21 at ground level is preferably about 2–8 inches (about 5–20 cm), more preferably about 4–6 inches (about 10–15 cm), and most preferably about 5 inches (about 12.7 cm).

One critical feature of the trenches 21 formed by trench forming device 20 of the present invention, is that the soil on the inner surfaces 21s of the trenches 21 is compacted so as to form a hard pack or a compacted soil surface. This hard pack will reduce the loss of soil moisture due to evaporation from the trenches 21 and will form a firmer, structurally more sturdy trench 21, thereby providing a better trench 21 to guide the front wheels 6 or guide wheels 68 of farm equipment.

Farm equipment, including tractors 2 and other farm implements 78, including planters 70, cultivators 80 and chemical applicators 90, generally include guiding mechanisms 66 for guiding farm equipment. These guiding mechanisms 66 can follow or track a path, such as that provided by the trench 21 created by the trench forming device 20 as shown in FIGS. 1 and 4. These mechanisms 66 include the smaller front wheels 6 on a tractor 2 and guide wheels 68 which are often attached to farm implements 78. It will be appreciated that not all cultivators 80 and not all other implements 68 have guide wheels 68 as shown on the planter 70 shown in FIGS. 8 and 9.

Because the hydraulic cylinders 46 of the present invention enable the disks 24 to form extremely compact inner soil surfaces 21s in the trenches 21 formed in accordance with the present invention, farmers can cultivate their row crops and carry out many other farming operations preferably at speeds of up to about 10–15 mph.

It is believed that the trenches 21 formed by the method of the present invention will withstand wind and rain erosion much better than trenches formed by the prior art methods and devices. Preferably, trenches 21 formed by utilization of the present methods and apparatus will last preferably for an entire growing season in the upper Midwest, or about four or five months, more preferably about six to eight months.

Figure 8:
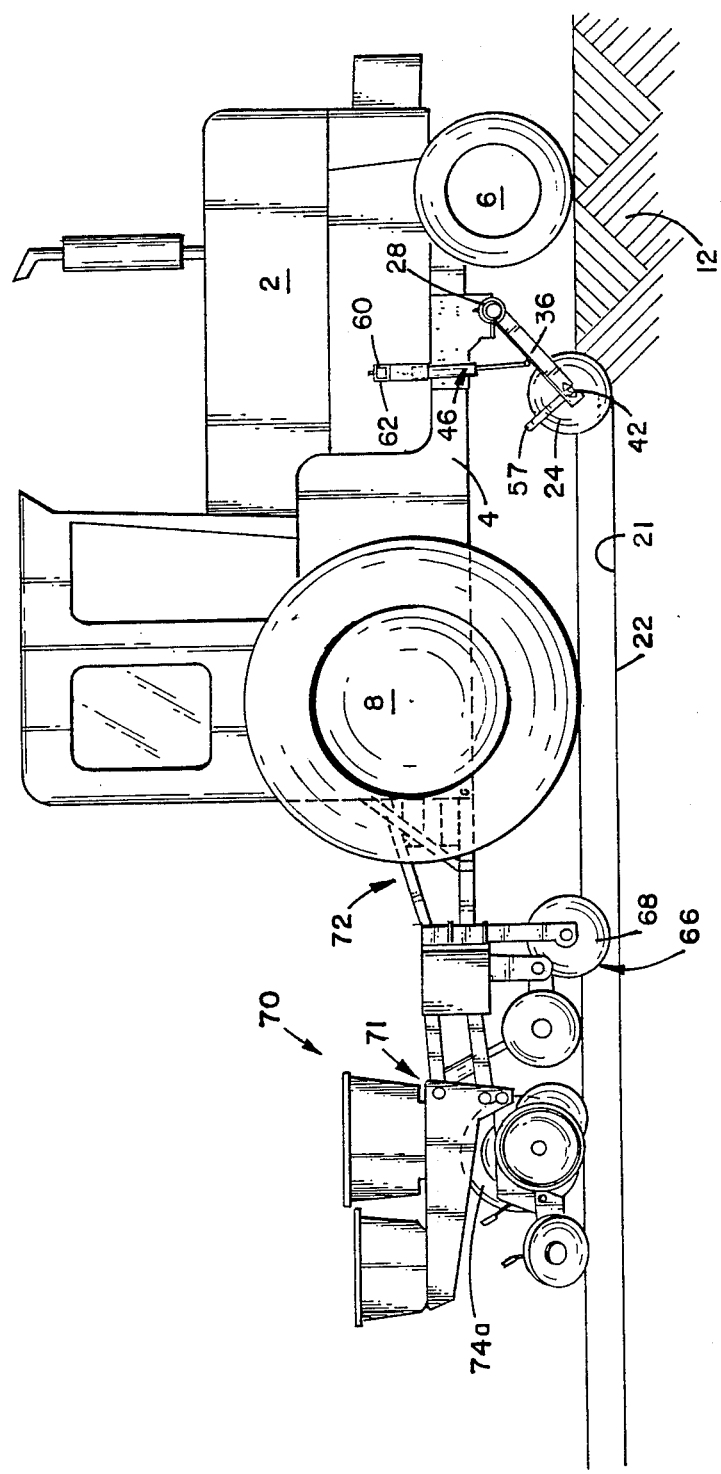
FIG. 8 is a side view of a tractor traversing ground with a trench forming device set to a desired depth such that a trench is formed, and pulling a loosely hitched planter having a guide wheel engaged in the trench.
Figure 9:
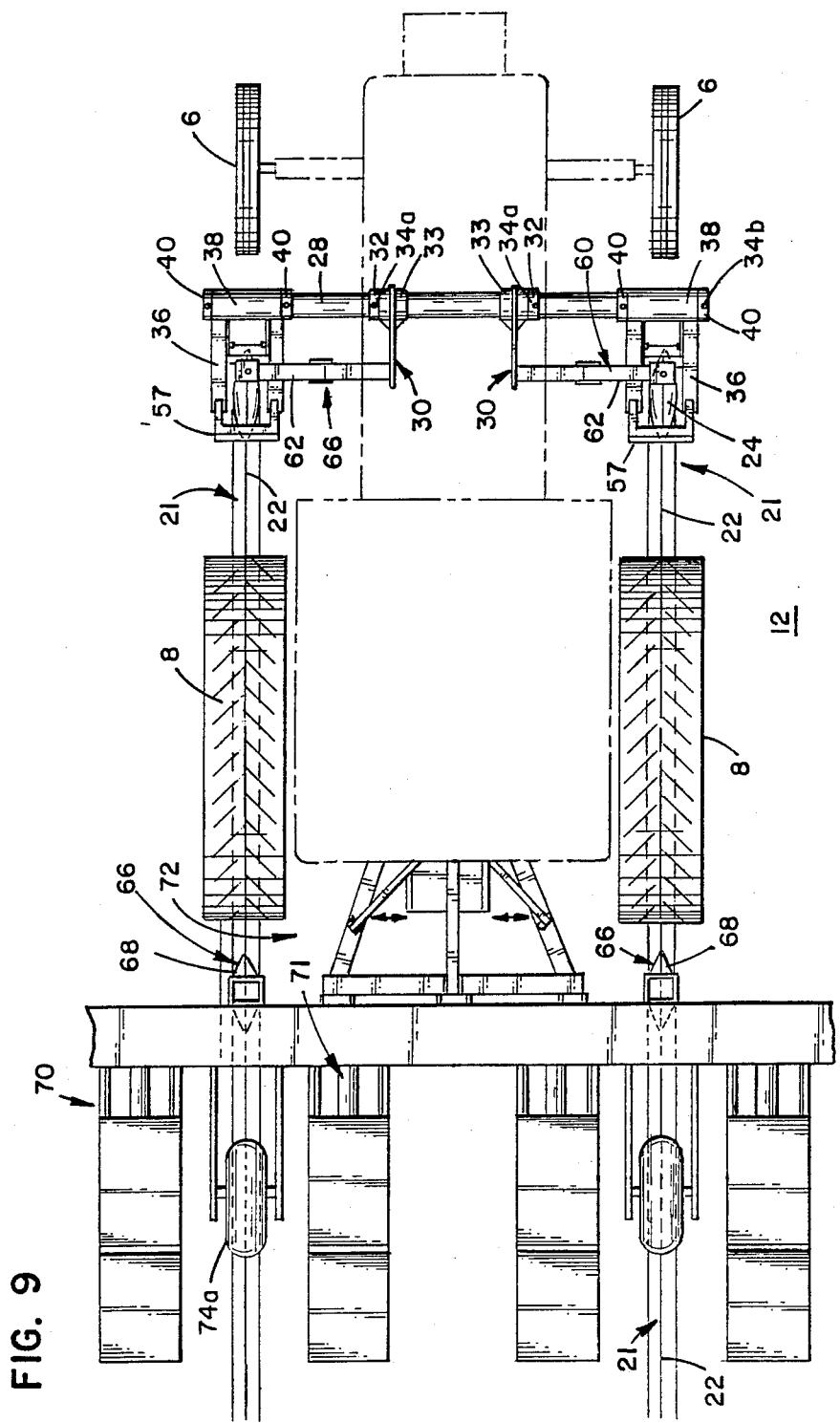
FIG. 9 is a plan view showing two substantially parallel trenches, partially in phantom, formed by a trench forming device of the present invention attached to a tractor shown in phantom which is pulling a loosely hitched planter having guide wheels which are tracking the trenches.

Referring now to FIGS. 8 and 9, a trench 21 can be formed by the trench forming device 20 of the present invention when the tractor 2 is pulling an implement, preferably a planter 70. FIG. 8 shows a side view of a tractor 2 equipped with a trench forming device 20. The disk 24 shown in the side view is set at a desired depth for forming a trench 21. The tractor 2 is pulling a planter 70 having a mechanism for planting row crops 71. The planter 70 is hitched to the tractor with a loose hitch 72 which allows the planter to take a path which can vary from a path taken by the tractor 2 preferably by up to about 1–20 inches (2.5–50 cm), more preferably about 2–10 inches (about 5–25 cm), and even more preferably about 4–8 inches (about 10–°cm) on either side of the tractor 2. Because the loose hitch 72 allows the planter 70 to sway independent of the tractor 2, the guide wheels 68 are able to follow or track the path 22 provided by the trench 21. The front wheels 6 of the tractor 2, the disks 24, the back wheels 8, and the guide wheels 68 of the planter 70 are all aligned with each other. The spacing between the individual wheels in each pair is adjustable so that provision for different spacing between substantially parallel trenches 21 formed by the trench forming device 20 of the present invention, and the line 85 of the row crops can be varied by adjusting the spacing of the disks 24 and of the wheels 6, 8 and 68. In this way, row crops can be planted in a line 85 substantially parallel to the path 22 of the trenches 21 formed by the device 20 of the present invention. The planter 70 also has implement support wheels 74a which support the planter 70. These wheels may also be adjusted so that their spacing with respect to one another may be varied.

In accordance with the present invention, a method a forming a trench 21 for guiding farm equipment is provided. The method includes the steps of attaching a trench forming device 20 to the undercarriage 4 of a tractor 2 behind the front wheels 6 and in front of the rear wheels 8; traversing ground 12 with the tractor 2 equipped with the trench forming device 20 set to a desired depth; and forming a trench 21 for guiding farm equipment in front of the rear wheels of the tractor 2 as the tractor traverses the ground 12 when the transforming device 20 engages the ground 12. Preferably the step of forming a trench 21 includes forcing the trench shaping disks 24 into the ground 12 such that the ground 12 is compacted. Furthermore, the step of forming a trench 21 preferably includes forming two substantially parallel trenches 21 having a greatest width 21w of greater than about 3 inches (about 7.5 cm) and a depth 21d of at least about 3 inches (about 15 cm). The trenches 21 are formed behind the front wheels 6 and in front of the rear wheels 8 of the tractor 2. Preferably, the method of forming a trench for guiding farm equipment further includes the steps of hitching a planter 70 to the tractor 2 with a loose hitch 2; engaging the guide wheels 68 of the planter 70 and the trenches 21 formed by the trench forming device 20 attached to the tractor 2; pulling the planter 70 behind the tractor 2 when the tractor 2 traverses the ground 12; and planting row crops with the planter 70 when the tractor 2, traversing the ground 12 and forming a trench 21, pulls the planter. The planter 70 includes a mechanism for planting row crops 71. Preferably, this method further includes the steps of unhitching the planter 70; hitching a farm implement 78 to the tractor with a loose hitch 72; in preparation for a farming operation subsequent to planting engaging the front wheels 6 of the tractor 2 in the previously formed trenches 21; engaging the implement guide wheels 68' in the previously formed trenches 21; and traversing previously traversed planted ground with the tractor 2 pulling the farm implement 78. The front wheels 6 of the tractor 2 track the trenches 21 so that the tractor 2 follows the paths 22 provided by the trenches 21. The implement guide wheels 68' also track the trenches 21 so that the implement 78 follows the paths 22 provided by the trenches 21. It will be appreciated that the implement 78 can carry out many functions. When the implement 78 is a cultivator 80 having cultivation blades 81 for cultivating row crops, the method further includes the step of previously planted row crops. When the implement 78 includes a mechanism for applying chemicals 88, the method further includes the step of applying chemicals to the previously planted row crops with a chemical applicator 90.

Figure 10:
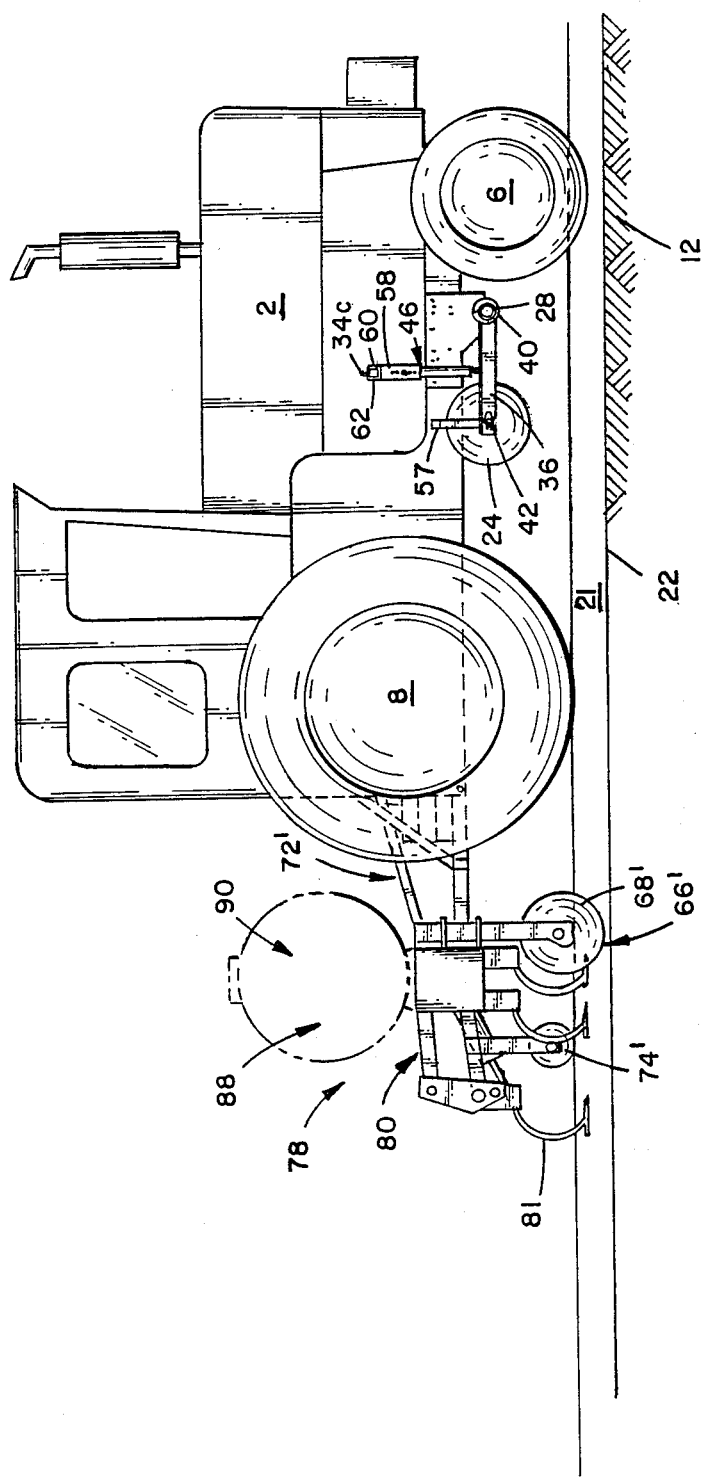
FIG. 10 is a side view of a tractor tracking a previously formed trench and pulling a farm implement which is tracking the path provided by the trench.

Referring now to also FIGS. 10 and 11, the present invention also provides for guiding other farm implements 78 by tracking a path 22 provided by a trench 21 formed in a previous traversal of the ground 12, preferably in a planting operation. The subsequent farming operations which can be carried out following planting include but are not limited to cultivation of the crops and chemical application to the crops, preferably row crops. When the implement 78 carrying out these subsequent farming operations is pulled by the tractor 2 is shown in FIGS. 10 and 11, the guide wheel 68 prime tracks a path 22 provided by a trench 21 formed in a prior farm operation. The implement 78 is hitched to the tractor 2 with a loose hitch 72 prime which allows the implement to take a path which can vary from a path taken by the tractor 2 by up to about 2–10 inches (about 5–25 cm), preferably about 4–8 inches (about 10–20 cm). Therefore, if the front wheels 6 of the tractor 2 track the path 22 provided by the trench 21 formed during prior farming operations, preferably planting operations, the implement 78 can be guided independently along the trench 21 by the guide wheels 68 prime which follow or track the path 22 provided by the trench 21. All the wheels 6, 8, 68 prime are aligned so as to avoid crushing the plants in the crop rows 85. The implement 78 can have cultivator blades 81 in which case the implement is a cultivator 80 is the implement 78 has a mechanism for applying chemicals 88 as shown in Phantom in FIG. 10 the implement 78 can be a chemical applicator 90 which can be used to apply chemicals to the crops, preferably along a plurality of lines 85 of crop rows.

It is to be understood, however, that even though these numerous characteristics and advantages of the invention have been set forth in the foregoing description, together with details of the structure and function of the invention, the disclosure is illustrative only, and changes may be made in detail especially in matters, size and arrangement of parts within the principle of the invention to the full extent indicated by the broad general meaning of the terms in which the appendant claims are expressed.

What is claimed is:

1. A method of guiding farm equipment, comprising the steps of:
   (a) attaching trench forming means for compacting ground to form a guidance trench to a tractor, said tractor having an undercarriage and a plurality of ground engaging wheels including front wheels and rear wheels, said trench forming means being attached to the undercarriage of the tractor behind and generally aligned with the front wheels and in front of the rear wheels;
   (b) traversing ground with the tractor equipped with said trench forming means set to a desired depth;
   (c) compacting the ground to form a guidance trench for guiding farm equipment in front of the rear wheels of the tractor as the tractor traverses the ground when said trench forming means engage the ground, the farm equipment including means for guiding the farm equipment along a path;
   (d) engaging said guide means in the trench; and
   (e) guiding the farm equipment by tracking a path provided by the trench.

2. The method of claim 1 wherein the farm equipment includes a planter including means for planting row crops, said planter being hitched to the tractor with a loose hitch, said loose hitch allowing the planter to take a path which can vary from a path taken by the tractor by up to about 2-10 inches (about 5-25 cm), said guide means being attached to the planter, said method further comprising the step of planting row crops with the planter, wherein the planter tracks the path provided by the trench.

3. The method of claim 1 wherein the farm equipment includes a cultivator including means for cultivating crops, said cultivator being hitched to a subsequent tractor with a loose hitch, said loose hitch allowing the planter to take a path which can vary from a path taken by the tractor by up to about 2-10 inches (about 5-25 cm), said guide means being attached to the cultivator, said method further comprising the step of cultivating crops, wherein this cultivator tracks the path provided by the trench.

4. The method of claim 1 wherein the farm equipment includes a chemical applicator including means for applying chemicals to crops, said applicator being hitched to a subsequent tractor with a loose hitch, said loose hitch allowing the planter to take a path which can vary from a path taken by the tractor by up to about 2-10 inches (about 5-25 cm), said guide means being attached to the applicator, said method further comprising the step of applying chemicals to crops, wherein the applicator tracks the path provided by the trench.

5. A method of forming a guidance trench for guiding farm equipment said method comprising the steps of:
   (a) attaching trench forming means to a tractor, the tractor having an undercarriage, and ground engaging wheels including front wheels and rear wheels, said trench forming means being attached to the undercarriage of the tractor behind and generally aligned with the front wheels and in front of the rear wheels;
   (b) traversing ground with the tractor equipped with said trench forming means set to a desired depth; and
   (c) compacting the ground to form a guidance trench for guiding farm equipment in front of the rear wheels of the tractor as the tractor traverses the ground when said trench forming means engage the ground.

6. The method of claim 5 wherein said trench forming means include disk means for forming a trench, said disk means include two trench shaping disks and a disk support structure, said support structure being pivotally attached to the undercarriage of the tractor behind the front wheels and in front of the rear wheels, said disks being rotatably attached to said support structure such that said disks form two substantially parallel trenches when the ground is traversed by the tractor and the trench forming means are set to a desired depth, the step of forming a trench including forcing said trench shaping disks into the ground such that the ground is compacted.

7. The method of claim 6 wherein the step of forming a trench includes forming two substantially parallel trenches having a greatest width of greater than about 3 inches (about 7.5 cm), and a depth of at least about 6 inches (about 15 cm), said trenches being formed by said disks, said disks being located behind the front wheels and in front of the rear wheels of the tractor.

8. The method of claim 7 further comprising the steps of:
   (d) hitching a planter to the tractor with a loose hitch, the loose hitch allowing the planter to take a path which can vary from a path taken by the tractor by up to about 2-10 inches (about 5-25 cm), the planter having guide means for guiding the planter along a path;
   (e) engaging said guide means in the trench, said guide means tracking the trench so that the planter follows a path substantially the same as a path provided by the trench;
   (f) pulling the planter behind the tractor when the tractor traverses the ground, said planter having means for planting row crops; and
   (g) planting row crops with said planter when the tractor, traversing the ground and forming a trench, pulls the planter.

9. The method of claim 8 further comprising the steps of:
   (h) unhitching said planter;
   (i) hitching a farm implement to the tractor with a loose hitch in preparation for a farming operation subsequent to planting, said farm implement having guide means for guiding the implement along a path;
   (j) engaging one of the front wheels in the previously formed trench;
   (k) engaging said implement guide means in the previously formed trench; and
   (l) traversing previously traversed planted ground with the tractor pulling said farm implement, said front wheel tracking the trench so that the tractor follows the path provided by the trench, said implement guide means tracking the trench so that the implement follows the path provided by the trench.

10. The method of claim 9, said implement being a cultivator having means for cultivating row crops, said method further comprising the step of cultivating the previously planted row crops.

11. The method of claim 9, said implement including means for applying chemicals to row crops, said method further comprising the step of applying chemicals to the previously planted row crops.

12. A method of planting row crops, comprising the steps of:
 (a) attaching means for forming a guidance trench to a tractor, said tractor having an undercarriage and a plurality of ground engaging wheels including front wheels and rear wheels; said trench forming means being attached to the undercarriage of the tractor behind and generally aligned with the front wheels and in front of the rear wheels;
 (b) transversing ground with the tractor equipped with said trench forming means set to a desired depth;
 (c) compacting the ground to form a guidance trench for guiding farm equipment in front of the rear wheels of the tractor as the tractor traverses the ground when said trench forming means engage the ground;
 (d) hitching a planter to the tractor with a loose hitch, the loose hitch allowing the planter to take a path which can vary from a path taken by the tractor by up to about 2-10 inches (about 5-25 cm), the planter having guide means for guiding the planter along a path;
 (e) engaging said guide means in the trench, said guide means tracking the trench so that the planter follows a path substantially the same as a path provided by the trench;
 (f) pulling the planter behind the tractor when the tractor traverses the ground, said planter having means for planting row crops; and
 (g) planting row crops with said planter when the tractor,.traversing the ground and forming a trench, pulls the planter.

13. A method of cultivating row crops, comprising the steps of:
 (a) attaching means for forming a guidance trench to a tractor, said tractor having an undercarriage and a plurality of ground engaging wheels including front wheels and rear wheels; said trench forming means being attached to the undercarriage of the tractor behind and generally aligned with the front wheels and in front of the rear wheels;
 (b) traversing ground with the tractor equipped with said trench forming means set to a desired depth;
 (c) compacting the ground to form a guidance trench for guiding farm equipment in front of the rear wheels of the tractor as the tractor traverses the ground;
 (d) hitching a planter to the tractor with a loose hitch, the loose hitch allowing the planter to take a path which can vary from a path taken by the tractor by up to about 2-10 inches (about 5-25 cm), the planter having guide means for guiding the planter along a path;
 (e) engaging said guide means in the guidance trench, said guide means tracking the trench so that the planter follows a path substantially the same as a path provided by the trench;
 (f) pulling the planter behind the tractor when the tractor traverses the ground, said planter having means for planting row crops;
 (g) planting row crops with said planter when the tractor, traversing the ground and forming a trench, pulls the planter;
 (h) unhitching said planter;
 (i) hitching a cultivator including means for cultivating row crops to the tractor with a loose hitch in preparation for a farming operation subsequent to planting, said cultivator having guide means for guiding the cultivator along a path;
 (j) engaging one of the front wheels in the previously formed trench;
 (k) engaging said cultivator guide means in the previously formed trench; and
 (l) traversing previously traversed planted ground with the tractor pulling said cultivator, said front wheel tracking the trench so that the tractor follows the path provided by the trench, said cultivator guide means tracking the trench so that the cultivator
 (m) cultivating the previously planted row crops with said cultivator.

14. A method of applying chemicals to row crops, comprising the steps of:
 (a) attaching means for forming a guidance trench to a tractor, said tractor having an undercarriage and a plurality of ground engaging wheels including front wheels and rear wheels; said trench forming means being attached to the undercarriage of the tractor behind and generally aligned with the front wheels and in front of the rear wheels;
 (b) traversing ground with the tractor equipped with said trench forming means set to a desired depth;
 (c) compacting the ground to form a guidance trench for guiding farm equipment in front of the rear wheels of the tractor as the tractor traverses the ground when said trench forming means engage the ground;
 (d) hitching a planter to the tractor with a loose hitch, the loose hitch allowing the planter to take a path which can vary from a path taken by the tractor by up to about 2-10 inches (about 5-25 cm), the planter having guide means for guiding the planter along a path;
 (e) engaging said guide means in the guidance trench, said guide means tracking the trench so that the planter follows a path substantially the same as a path provided by the trench;
 (f) pulling the planter behind the tractor when the tractor traverses the ground, said planter having means for planting row crops;
 (g) planting row crops with said planter when the tractor, traversing the ground and forming a trench, pulls the planter;
 (h) unhitching said planter;
 (i) hitching a chemical applicator having means for applying chemicals to row crops to the tractor with a loose hitch in preparation for a farming operation subsequent to planting, said applicator having guide means for guiding the applicator along a path;
 (j) engaging one of the front wheels in the previously formed trench;
 (k) engaging said applicator guide means in the previously formed trench; and (l) traversing previously traversed planted ground with the tractor pulling said applicator, said front wheel tracking the trench so that the tractor follows the path provided by the trench, said applicator glide means tracking the trench so that the applicator follows the path provided by the trench; and (m) applying chemicals to the previously planted row crops with said chemical applicator.

15. A guidance trench forming device for attachment to a tractor, the tractor having an undercarriage and ground engaging wheels including front wheels and rear wheels said trench forming device comprising generally wedge-shaped trench forming means for compacting ground to form a guidance trench in ground traversed by the tractor, said guidance trench forming means being attached to the undercarriage of the tractor and being located behind and generally aligned with the front wheels and in front of the rear wheels of the tractor such that a guidance trench can be formed in front of the rear wheels when the tractor traverses the ground and said trench forming means are engaged in the ground.

16. The trench forming device of claim 15, said trench forming means including disk means for forming at least one trench when said tractor traverses the ground and said disk means are forced into the ground.

17. The trench forming device of claim 16, said disk means including a disk support structure and two trench shaping disks rotatably attached to said support structure, said support structure being pivotally attached to the tractor such that said trench shaping disks can form two substantially parallel trenches when the tractor traverses the ground.

18. The trench forming device of claim 17, said disks being spaced so that they are in alignment with the front wheels of the tractor.

19. The trench forming device of claim 18, said disks being spaced in alignment with the rear wheels.

20. The trench forming device of claim 17, each of said trench shaping disks having a diameter of about 10–35 inches (about 25–90 cm) and a greatest width of about 2–8 inches (about 5–20 cm).

21. A guidance trench forming device for attachment to a tractor having front wheels, rear wheels and an undercarriage said device comprising disk means including a generally V-shaped trench forming portion for forming a guidance trench, means for attaching said disk means to the undercarriage of the tractor behind and generally aligned with the front wheels and in front of the rear wheels of the tractor, and means for forcing said disk means into the ground such that the ground is compacted and shaped to form at least one trench when the tractor, equipped with disk means attached to the undercarriage and set to a desired depth, traverses the ground.

22. The trench forming device of claim 21, said disk means including two trench shaping disks, a disk support structure and a mounting bar, said mounting bar being attached to the undercarriage of the tractor, said support structure being pivotally attached to said mounting bar, and said disks being rotatably attached to said support structure, wherein said disks can be raised to disengage or lowered to engage the ground in a location behind the front wheels and in front of the rear wheels of the tractor.

23. The trench forming device of claim 22, including hydraulic cylinder means for raising and lowering said disk means and cylinder mounting means for mounting said cylinder means to the tractor, said cylinder means including two hydraulic cylinders, said mounting means being mounted on the tractor, each of said cylinders being pivotally attached to said mounting means and to said disk support structure, said cylinder means having the capability of forcing said disks into the ground so as to compact the ground as the disks traverse the ground thereby forming at least two substantially parallel trenches.

24. The trench forming of claim 23, said support structure including adjustment means for adjusting the spacing between said disks, said adjustment means including two collars which are rotatably attached to said mounting bar, the positioning of said collars being adjustable such that the spacing between the disks may be varied, wherein the spacing between the parallel trenches may be varied in accordance with a variation in the spacing of the disks.

25. The trench forming device of claim 23, said support structure including a disk supporting portion, a stable mounting portion and obstruction fault release means for releasing the disk supporting portion of said support structure when one of said disks or said supporting portion of said support structure collides with an immovable obstruction, said release means including a sheer pin, said sheer pin holding said supporting portion in line with said stable mounting portion, wherein said sheer pin can be broken when said disk or said supporting portion collides with an immovable obstruction when the tractor traverses the ground such that said supporting portion is freed to pivot with respect to the mounting bar thereby allowing the disk to rise with respect to the ground allowing the obstruction to pass under the disk.

26. A guidance trench forming device for attachment to a tractor, said tractor having an undercarriage and a plurality of ground engaging wheels including front wheels and rear wheels, said device comprising:

(a) a mounting bar including means for attaching said mounting bar to the tractor, said mounting bar being attached to the undercarriage of the tractor;

(b) disk means for forming at least one guidance trench in ground traversed by the tractor, said disk means including two trench shaping disks and a disk support structure, each said disk having a generally V-shaped trench forming portion, said disks being rotatably attached to said disk support structure, wherein two substantially parallel guidance trenches are formed when said disk means are forced into the ground as the ground is traversed, said support structure being pivotally attached to said mounting bar such that said disks can be raised to disengage, or lowered to engage, the ground in a location behind and generally aligned with the front wheels and in front of the rear wheels, said support structure being adjustably attached to the mounting bar such that the spacing between the disks can be adjusted by adjusting the positioning of the support structure on the mounting bar, each of said disks having a diameter of about 10–35 inches (about 25–90 cm) and a greatest width of about 2–8 inches (about 5–20 cm), wherein each disk can be aligned with a front wheel and a rear wheel of the tractor when front and rear wheels of the tractor are aligned;

(c) hydraulic cylinder means for raising and lowering said disk means, said cylinder means including two hydraulic cylinders; and (d) cylinder mounting means for mounting said cylinders to the tractor, said cylinder mounting means being attached to the tractor, each of said cylinders being pivotally attached to said cylinder mounting means and to said disk support structure, said cylinders being oriented in parallel, said pivotal attachments of said cylinders to said disk support structure and to said cylinder mounting means, and said pivotal attachment of said support structure to said mounting bar forming three pivot points of a three point lift mechanism; said cylinder means having the capability of forcing said disks into the ground so as to compact the ground as the disks traverse the ground, thereby forming said substantially parallel trenches.

27. The trench forming device of claim 26 wherein each of said hydraulic cylinders is a 3 inch hydraulic cylinder, said cylinder means including hydraulic control means.

28. A guidance trench forming device comprising:
(a) a tractor having an undercarriage and a plurality of ground engaging wheels, including front and rear wheels;
(b) a mounting bar including means for attaching said mounting bar to said tractor, said mounting bar being attached to the undercarriage of the tractor; in front of the rear wheels and behind the front wheels;
(c) disk means for forming at least one guidance trench, said disk means including two trench shaping disks and a disk support structure, each said disk having a generally V-shaped trench forming portion, said disks being rotatably attached to said support structure, said support structure being pivotally attached to said mounting bar such that said disks can be raised to disengage, or lowered to engage, the ground in a location behind and generally aligned with front wheels and in front of said rear wheels of said tractor, each disk being alignable with a front wheel and a rear wheel of said tractor when front and rear wheels of said tractor are aligned;
(d) hydraulic cylinder means for raising and lowering said disk means, said cylinder means including two hydraulic cylinders; and
(e) cylinder mounting means for mounting the cylinders to the tractor, said cylinder mounting means being attached to the tractor, said cylinders being pivotally attached to said cylinder mounting means and to said disk support structure, said cylinders being oriented in parallel, said cylinder means having the capability of forcing said disks into the grounds so as to compact the ground as the disks traversed the ground, thereby forming two substantially parallel trenches.

29. The trench forming device of claim 28, each of said disks having a diameter of about 10-35 inches (about 25-90 cm) and a greatest width of about 2-8 inches (about 5-20 cm).

30. An apparatus for planting row crops, comprising:
(a) a tractor having an undercarriage and a plurality of ground engaging wheels including front, wheels and rear wheels;
(b) disk means for compacting the ground to form at least one guidance trench, said disk means including two trench shaping disks, said disk means being attached to each said disk having a generally V-shaped trench forming portion, said undercarriage of said tractor such that two substantially parallel guidance trenches are formed in a location behind and generally aligned with the front wheels and in front of the rear wheels of said tractor when the tractor traverses the ground; and
(c) planting means for planting row crops, said planting means including guide wheels, said planting means being loosely hitched to said tractor such that a path taken by said planting means can vary from a path taken by said tractor by up to about 2-10 inches (about 5-25 cm), said guide wheels tracking said substantially parallel guidance trenches when said planting means is in a lowered position such that said guide wheels are engaged in said trenches.

* * * * *